3,178,695
INDICATING APPARATUS
Carl L. Cadwell, Wilkins Township, Allegheny County, and William F. Cruess, Monroeville, Pa., assignors to Westinghouse Electric Corporation, East Pittsburgh, Pa., a corporation of Pennsylvania
Filed June 28, 1960, Ser. No. 39,259
6 Claims. (Cl. 340—187)

This invention relates generally to indicating apparatus, and has reference in particular to impulse telemetering for indicating and recording the amount of deviation from the predetermined normal value of one or more variable quantities.

Generally stated, it is an object of this invention to provide apparatus for obtaining a numerical representation of the magnitude of deviation from the normal value of one or more monitored quantities.

It is another object of this invention to provide apparatus for obtaining a graphical representation of the magnitude of deviation from the normal value of one or more monitored quantities.

It is another object of this invention to provide apparatus for automatically converting analog quantities into digital form for use as code selector means in a control apparatus which transmits the coded signals to another point for decoding and recording.

Other objects will in part be obvious, and will in part be described hereinafter.

Generally, the invention contemplates comparing an unknown voltage, representing a variable quantity in analog form, with a predetermined voltage established by a prime potentiometer system connected across a fixed voltage source, wherein the predetermined voltage is preset by adjustment of the potentiometer to equal the value of the voltage normally established by the variable quantity. A balancing potentiometer is automatically varied, step-by-step, to change the predetermined voltage until balance is achieved between the unknown voltage and the voltage provided by the combined prime potentiometer system and the balancing potentiometer as indicated by a differential responsive means. The number of steps and the direction of steps taken by the balancing potentiometer from its initial normal position to the position required to balance the unknown voltage establishes in digital form the magniture of deviation of the unknown voltage from a predetermined normal value. The digital result is utilized to selectively operate a binary coding system to transmit a corresponding code to another station for decoding and recording.

More specifically, the invention contemplates successively comparing each of a plurality of unknown voltages, each representing a different function, with a separate prime potentiometer system for each unknown, each potentiometer system comprising potentiometer means preadjusted to provide a voltage equal to the normal voltage provided by the corresponding variable quantity. A programming system periodically and systematically connects each unknown voltage to the corresponding resistor system to effect operation of the binary coder in accordance with the acquired readings. The decoded readings are automatically recorded by a typewriter having special slugs so that over successive periods there is provided a graphical indication of the amount of deviation from the normal value of each of a plurality of variable quantities.

One embodiment of the invention comprises an analog-to-digital converter connected to operate a binary encoder for transmitting metering indications from a remote station to a master station. The analog-to-digital converter comprises a direct current voltage system operated by a regulated power supply as a reference voltage and includes potentiometer means preset to initially provide a voltage equal to the normal value of the variable quantity, and also includes a bridge balancing potentiometer system being adjustable in step-by-step fashion by operation of a bridge control relay system to balance the bridge when an unknown voltage is connected across the potentiometer in series opposed relationship with the predetermined reference voltage. A chopper and a null detecting amplifier are connected between the unknown voltage as one element of the bridge and the potentiometer system and bridge balancing potentiometer comprising the other element of the bridge to effect operation of the bridge balancing relays in accordance with the differential voltage. Counting relays are provided for operation in accordance with the operation of the null detecting amplifier and the bridge balancing relays to effect selective operation of the binary encoder to transmit in binary coded form the digital representation of the measured deviation of the variable quantity from its predetermined normal value.

In order to provide for sequentially telemetering the indications of all the variable quantities, there is provided a programming system comprising a clock timer to periodically operate a relay system including stepping switch means for sequentially connecting each unknown voltage and the corresponding potentiometer means into the bridging system.

The binary encoder and decoder system comprises coding means responsive to operation of the bridge balancing system to effect transmission of appropriate binary codes comprised of long and short pulses. The remote station decodes the pulses and effects operation of a typewriter which records each decoded signal in sequence with the previously recorded signal from the same variable quantity to provide a graph for each variable unknown, thus indicating the deviation from the normal value in graphical form.

For a more complete understanding of the nature and the scope of our invention, reference may be had to the following detailed description, which may be read in connection with the accompanying drawing, in which the drawing FIGS. 1–8 may be relatively positioned end-to-end in numerical order to comprise a diagrammatic view of the complete apparatus, and wherein FIGS. 1 and 2 taken together are a diagrammatic view of the analog-to-digital converter of the telemetering system embodying our invention in one of its forms.

In the drawings, the small or lower case letter following the oblique line in the reference character of each relay coil indicates the total number of contact pairs associated with that relay. For example, in reference character T/b, identifying the timer relay, the small or lower case letter b following the oblique line indicates that timer relay T has a total of two pairs of contacts which are found elsewhere in the drawing and which are identified as Ta, Tb, respectively. Inasmuch as the small or lower case letters following the oblique line in the coil reference characters do not serve to distinguish the coils from each other, they will be omitted from the descriptive matter in the specification to facilitate a terse identification of the relay coils.

Figure 1:
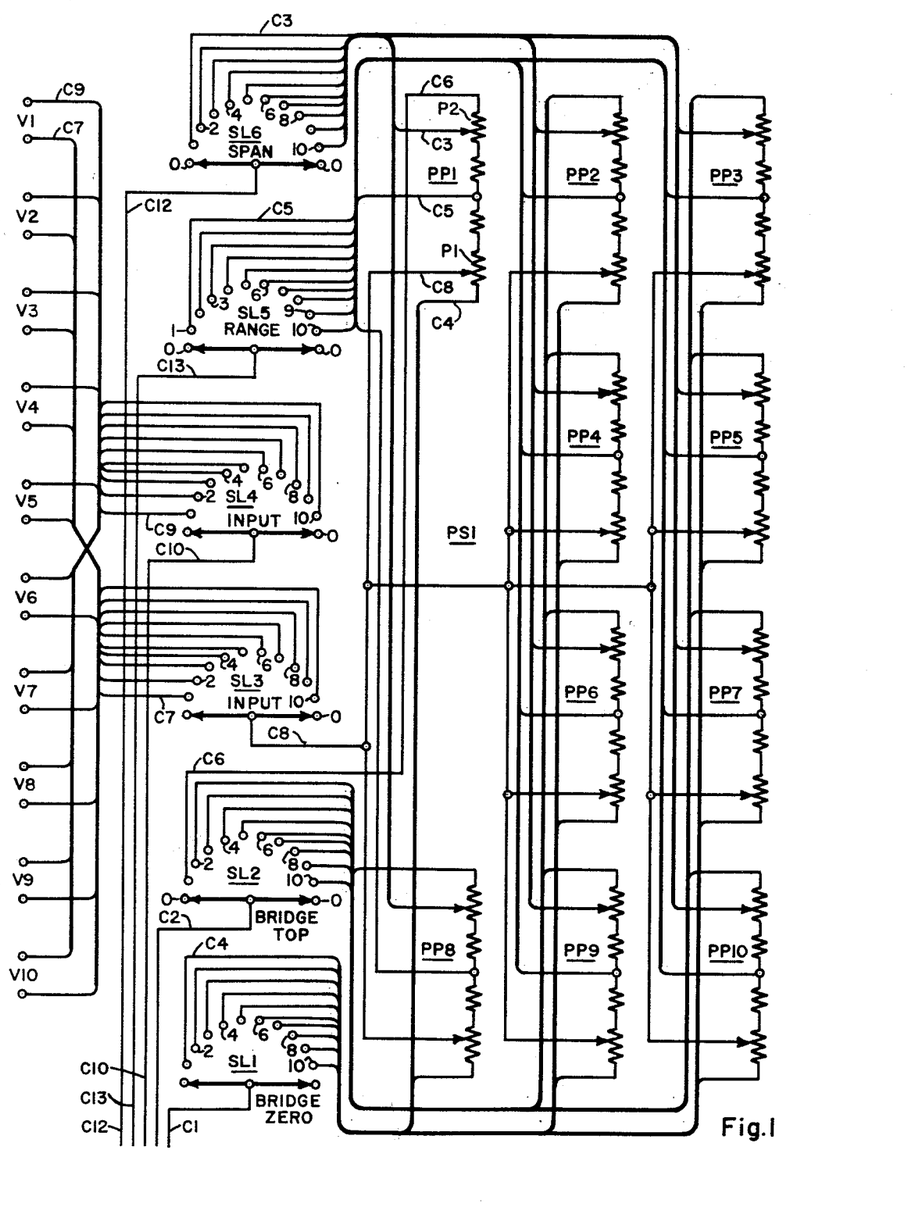
Figure 2:
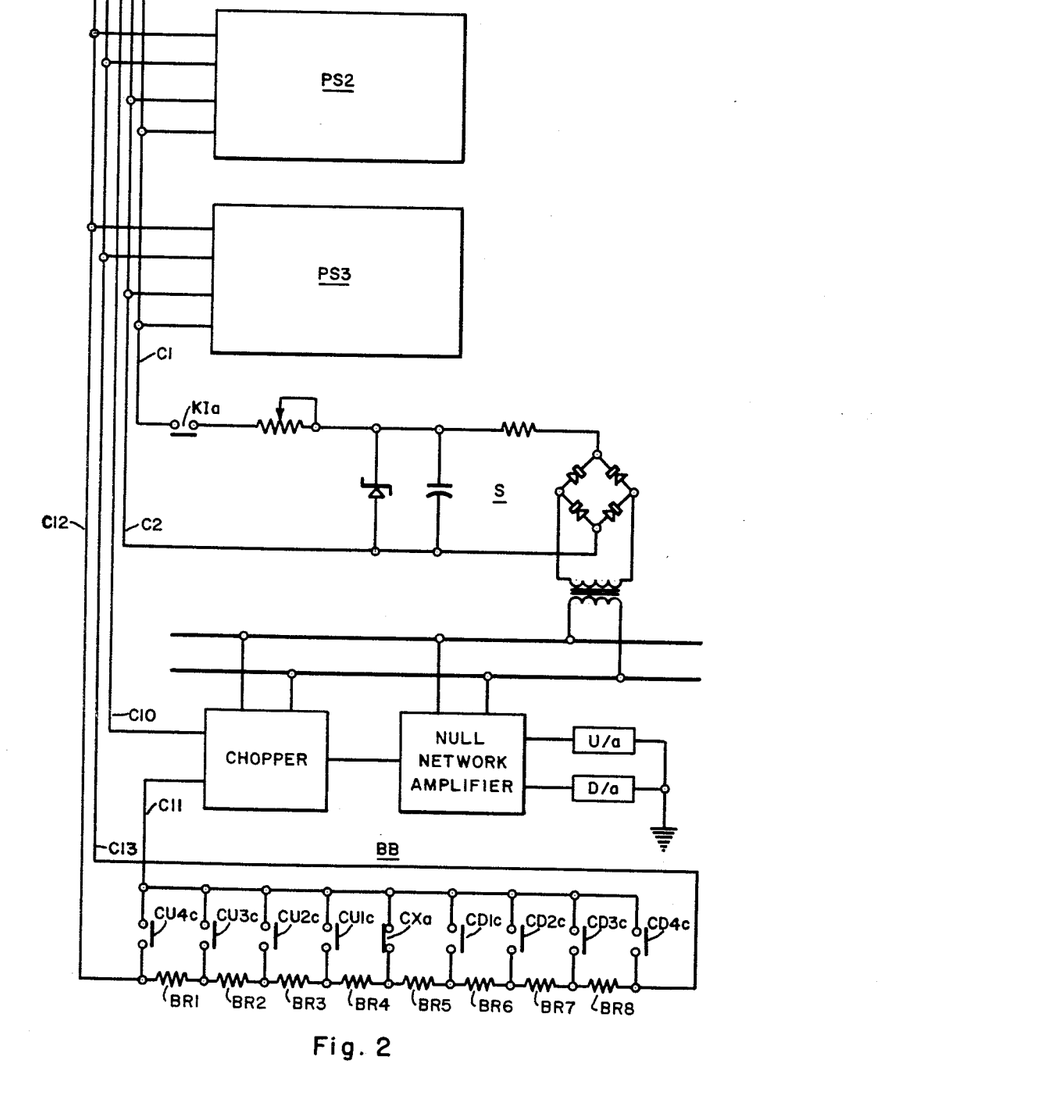
Figure 9:
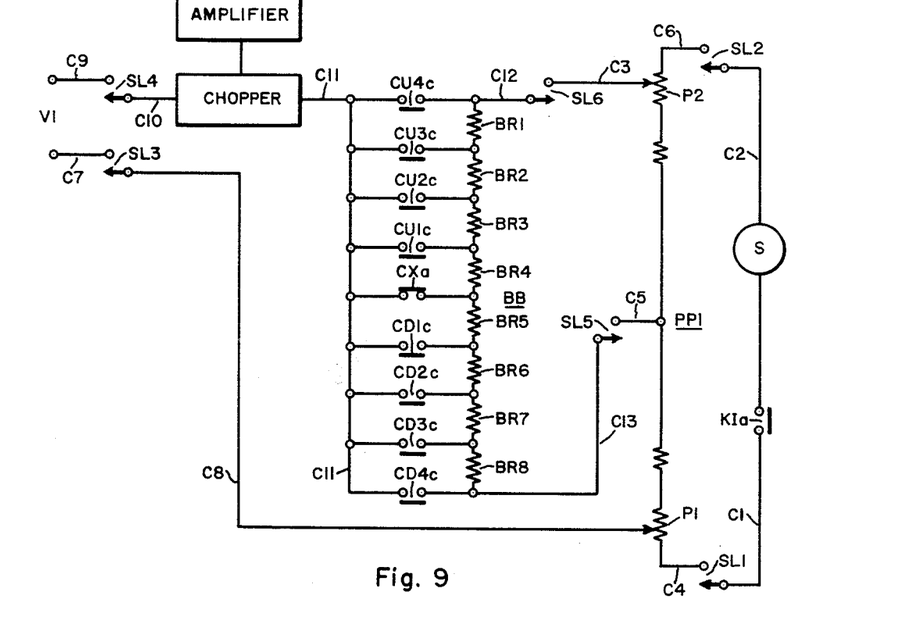
FIG. 9 is a schematic representation of the bridge system as it relates to a single variable quantity and the corresponding potentiometer system.

Referring to FIGS. 1, 2 and 9, the analog-to-digital converter will now be described as it relates to a typical one of the plurality of variable voltages V1 through V10, namely, variable voltage V1. It will be seen that one side of a regulated power supply S is connected through conductor C1, and the movable member and fixed contact 1 of stepping level SL1 of stepping relay S1, conductor C4 to the lower end of a pair of series-connected potentiometers P1 and P2 of potentiometer pair PP1. The other side of the regulated voltage S is connected through conductor C2, the movable member and fixed contact 1 of stepping level SL2 of the stepping relay S1, and conductor C6 to the upper end of the series-connected potentiometer pair PP1. In this manner the fixed voltage of the power supply S is connected to provide a constant voltage across the total resistance of the potentiometer pair PP1.

The bridge balancing system comprises a relay-operated potentiometer operable in response to the null detecting amplifier to increase or decrease the value of the reference voltage, depending upon whether the variable voltage is abnormal or subnormal, respectively. Specifically the resistance portion of the potentiometer comprises a plurality of series-connected balancing resistors BR1 through BR8, of equal value, connected in shunt across the lower tapped portion of potentiometer P2 in potentiometer pair PP1 from the variable tap member of potentiometer P2, through conductor C3, contact 1 and movable member of span stepping level SL6 of stepping relay S1, conductor C12, balancing resistors BR1 through BR8, conductor C13, movable member and contact 1 of range stepping level SL5, conductor 5 to the common connection between potentiometers P1 and P2. The variable tap mechanism of the bridge balancing potentiometer BB comprises a normally open shunt path at each end of the resistor group BR1 through BR8 and between each successive pair of resistors to conductor C11, the chopper and null detector amplifier, with the exception of the shunt path from the point between resistors BR4 and BR5, the midpoint of the series resistors, to conductor 11, which path is normally closed. As will be hereinafter described in detail, a bridge balancing relay system, comprising relays CU1–CU4 and CD1–CD4 operates in response to the output from the null detecting amplifier to successively close their respective contacts CU1c–CU4c and CD1c–CD4c to close the shunt path in one direction or the other from the central closed contact CXa of normal indication relay CX toward the end of the series resistors BR1–BR8, thus increasing or decreasing the reference voltage as it appears between the tap mechanism of the bridge balancing potentiometer BB, conductor C13, conductor 6, the tap point of potentiometer P1, conductor C4, contact 1 and the movable member of stepping level SL1 of stepping switch S1.

From the foregoing description, it is seen that the parallel relationship between the bridge balancing resistor system BB and the lower tapped portion of potentiometer P2 provides for adjustment of the voltage span of the bridge balancing system by the simple convenience of adjusting the variable tap of potentiometer P2.

Further, inasmuch as under normal conditions only the normal relay contacts CXa in the bridge balancing system BB are closed to the resistors BR5–BR8 in series with the upper tapped portion of the potentiometer P1 to thus establish the reference voltage to be compared with the variable voltage V1, it is seen that the value of the reference voltage may be selected by the convenience of adjusting the variable tap of potentiometer P1.

In order to initially equate the reference voltage range to the predetermined normal value of the variable voltage V, and also establish the voltage span of adjustment of the reference voltage, a simple two step span-range adjustment is performed. It is seen from the foregoing description that inasmuch as the bridge balance system BB is in parallel arrangement with potentiometer P2, any adjustment of the variable tap of potentiometer P2 to adjust the span effects a change in the resistance in series with the potentiometer P1, thus effecting a change in voltage drop across potentiometer P1 which in turn effects a change in the range. Alternatively, a change in the range by adjustment of the variable tap of potentiometer P1 does not change the resistance of the previously described span adjustment system. The span adjustment therefore, is not affected by a range adjustment. Accordingly, the voltage span is adjusted first, followed by an adjustment of the range, wherein the range adjustment equates the reference voltage across the lower tapped portion of the bridge resistors, namely, BR5–BR8, and the upper tapped portion of potentiometer P1 to the variable voltage V1.

In order to connect the voltage V1 in series opposition to the reference voltage as initially established between the tap member of potentiometer P1 and the lower end of potentiometer P2 as above described, there is provided a conductor C7 leading from one side of the unknown voltage V1 to contact 1 and the variable member of voltage input stepping level SL3 of stepping relay S1 through conductors C8 and C6 to the variable tap member of potentiometer P1. The other side of the unknown voltage V1 is connected through conductor C9, contact 1 and movable member of voltage input stepping level SL4 of stepping relay S1, conductor C10 through the D.C. to A.C. synchroverter or chopper and null detecting amplifier, conductor 11, and the bridge balancing resistor system BB, to be hereinafter described in detail, through conductor C12, movable member and contact 1 of span stepping level SL6 of stepping switch S1.

From the foregoing description, it is seen that operation of the stepping switch S1 from the zero position to the first position, thus effecting simultaneous movement of each of the movable members on each stepping level SL1 through SL6 from the zero contact to the No. 1 contact, the variable voltage V1 is connected in series opposition with a reference voltage equal to the normal value of the unknown voltage V1 as preset by adjustment of the potentiometer pair PP1. If the variable voltage is normal, the null detecting amplifier A will provide no output. If the variable voltage V1 is abnormal or subnormal, the null detector amplifier provides one output or another, respectively, to operate the bridge balancing system BB to adjust the reference voltage value as established by the taps of potentiometer pair PP1 to equal the prevailing value of the unknown voltage V1.

Referring to FIG. 1, it is seen that additional potentiometer sets PP2 through PP10, each identical to previously described potentiometer pair PP1, are provided relative to each unknown voltage V2 through V10, respectively. As the stepping switch S1 operates, to simultaneously operate all the stepping levels SL1 through SL6, each unknown voltage and its corresponding preadjusted potentiometer sets PP2 through PP10 are successively connected into the previously described bridge system with the source S, bridge balancing system BB, and null detecting amplifier as the stepping switch S1 moves the movable member of all stepping levels from contact 2 through 10, respectively. As will be hereinafter described in detail, as each unknown voltage and its corresponding potentiometer set are connected into the bridge, the bridge balancing system operates to automatically balance the bridge and effect transmission of a code corresponding to the digital deviation of the bridge from the normal value for the unknown voltage being monitored.

Figure 3:
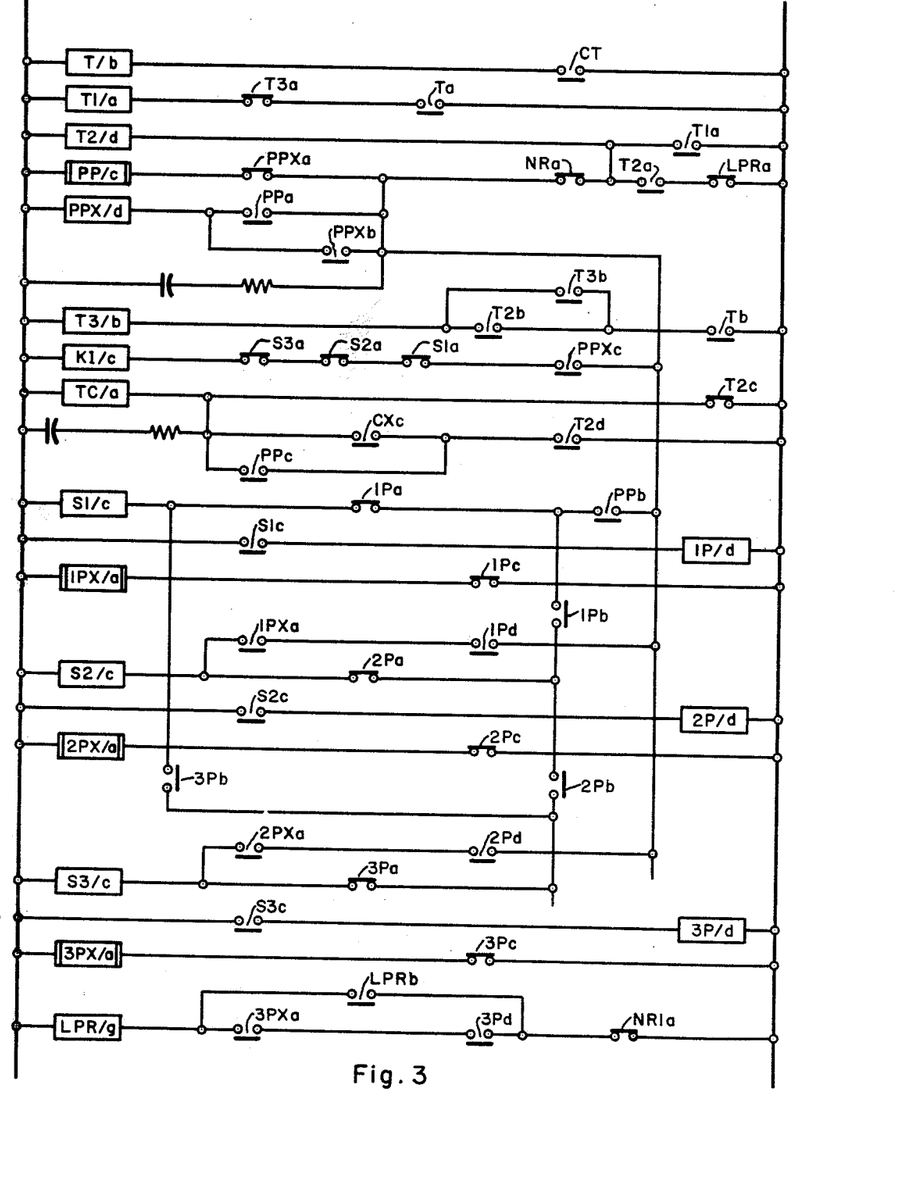
FIGS. 3 and 4 are a diagrammatic view of the programmer and bridge balancing control relay system disposed for use with the converter of FIGS. 1 and 2.

In order to provide for periodically operating the stepping relay S1 to effect scanning of the plurality of unknown voltages V1 through V10, there is provided a programmer system. Referring to FIG. 3, the programmer includes a clock timer contact CT operable in response to any suitable timing means to effect operation of timing relays T, T1 and T2, to prepare the programmer for stepping to the first function. The timer relays T1 and T2 control operation of stepping control relay PP and auxiliary stepping control relay PPX for effecting operation of stepping relay S1 to step to the first function, thus connecting the null detector amplifier and the unknown quantity V1 to the potentiometer pair PP1. A bridge connection relay K1 responds to operation of auxiliary relay PPX and stepping relay S1 to connect the output of the null detector amplifier to the relay equipment which operates to balance the bridge system. The normal reset relay NR (FIG. 5) is responsive to the completion of the sending of an appropriate code after the bridge is automatically balanced, as will be hereinafter described, and operates to effect operation of the stepping control relay PP to step the stepping switch S1 to the next function.

In the operation of the programmer, the timer contact CT closes to energize timer relay T, which effects energization of timer relay T1 through contact Ta and contact T3a of timer relay T3. Timer relay T1 closes its contact T1a to energize timer relay T2 which operates to and seals in through its own contact T2a and a normally closed contact LPRa of last point reset relay LPR. Timer relay T3 operates through contact Tb of timer relay T and contact T2b of timer relay T2 and seals in through contact T3b, and opens contacts T3a, thus interrupting the energization circuit for timer T1. The foregoing operation of timer relay T3 interlocks the system so that if the clock timer contact CT should stay closed longer than the time required to telemeter all functions, the programmer will stop and wait for the timer contact to open and reclose. At the same time, the sealing-in operation of timer relay T2 insures that the programmer goes through a complete sequence of operation even though the timer contacts may open before the program cycle is completed.

The operation of timer relay T2 completes a circuit to energize stepping control relay PP through contacts LPRa, T2a, NRa and PPXa. The operation of control relay PP closes contacts PPb to complete an energizing circuit for stepping relay S1 through contacts LPRa, T2a, NRa, PPb, 1Pb, 2Pb and 3Pb. Control relay PP operates to close its contacts PPa to complete a circuit to energize auxiliary relay PPX through contacts LPRa, T2a, and NRa. Control relay PPX picks up and seals in through its own contacts PPXb, NRa, T2a and LPRa. When control relay PPX picks up, contacts PPXa open to drop out control relay PP which in turn opens its contact PPb to release the coil of the stepping switch S1. As the coil S1 deenergizes, a movable member of each of the stepping switch levels SL1 through SL6 moves off the zero contact to the No. 1 contact, thus connecting the null detecting amplifier to the unknown quantity V1, and to the first set of potentiometers PP1 in the manner hereinbefore described in detail. As coil S1 deenergizes, connecting relay K1 is energized through contacts PPXc, and the interrupting contacts S1a, S2a and S3a of the stepping switches S1, S2 and S3, respectively. The connecting relay K1a operates to close its contacts K1a (FIG. 2) to apply voltage to the potentiometer for the first function. The operation of the connecting relay K1 also closes its contacts K1b (FIG. 4) to connect the output of the null amplifier to operate the bridge balancing relay system as will presently be described.

Figure 4:
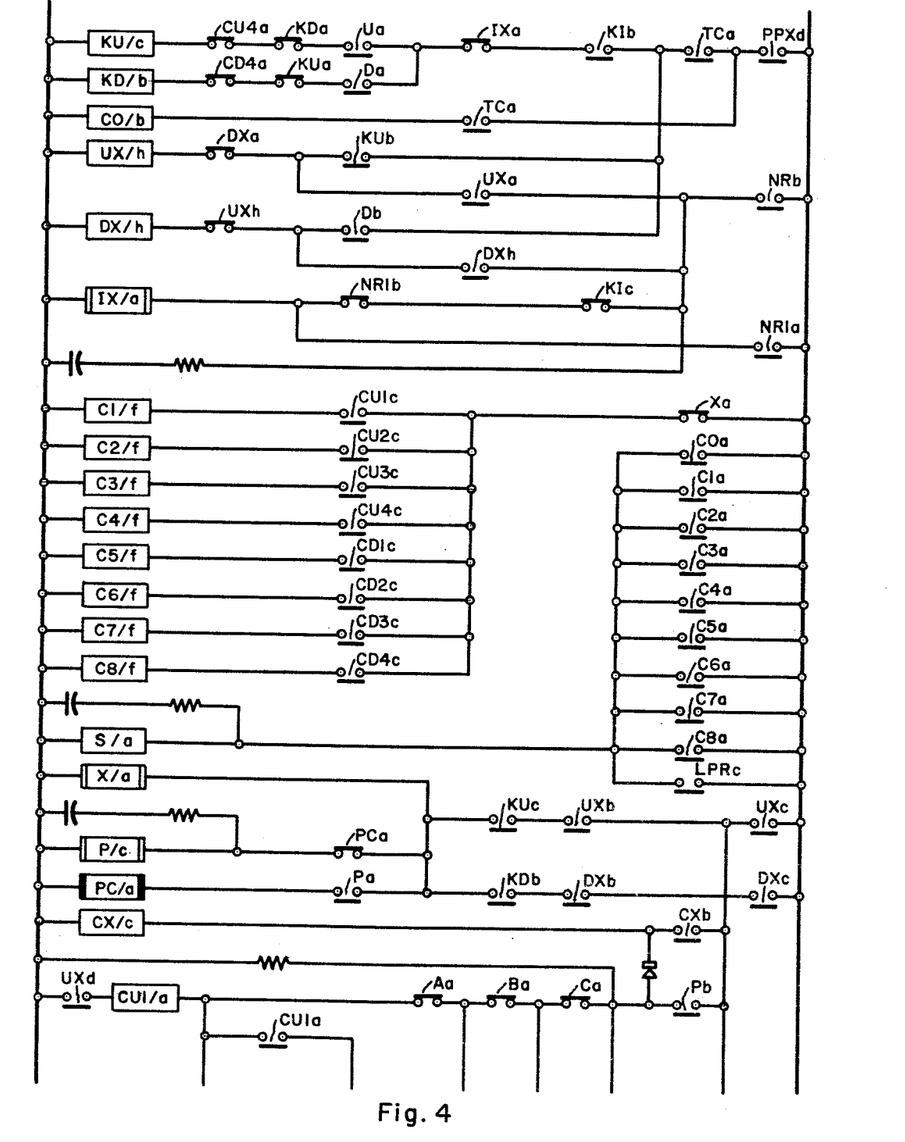

In order to provide for operating the previously described bridge balancing mechanism BB, there is provided a relay system responsive to operation of the null detector amplifier to increase or decrease the reference voltage to provide a balance or a null voltage differential with respect to the unknown voltage. When the connecting relay K1 and the stepping switch S1 operate to connect the voltage source S and the bridge balancing system BB to the potentiometer set PP1, as previously described, the null amplifier immediately operates either the high voltage indicator relay U or the low voltage indicator relay D (FIG. 2) depending upon whether the unknown voltage is higher or lower than the reference voltage established by the potentiometer pair PP1 and the source S. Referring to FIG. 4, a high voltage detector relay KU and a low voltage detector relay KD are adapted to be selectively controlled by the indication relays U and D (FIG. 2), the normal reset relay NR (FIG. 5) and the connecting relay KI to selectively operate auxiliary high voltage detector relay UX or low voltage detector relay DX to control operation of the bridge balancing stepping relays P and PC to prepare counting relays CU1 through CU4 and CD1 through CD4 (FIG. 5) to successively add or subtract the series resistors BR1 through BR8 in the bridge balancing system to effect balance of the direct current bridge system.

In describing the operation of the bridge balancing mechanism, it will be assumed that the unknown voltage V1 is high in value, that is, above normal. Under this condition, the null detector amplifier operates high voltage indication relay U which closes its contact Ua to effect operation of high voltage detecting relay KU through contacts PPXd, TCa, K1b, IXa, Ua, CU4a and KDa. Relay KU closes its contacts KUb to complete a circuit through contacts PPXd, TCa and DXa to operate auxiliary detecting relay UX which seals in through contacts UXa, NRb and DXa. Relay UX operates to close its contacts UXc, UXd, UXe, UXf and UXg to prepare the bridge balancing relays CU1 through CU4 for operation, and also closes contacts UXb to complete an energizing circuit for stepping relay P through contacts UXc, UXb, KUc and PCa. Stepping relay P operates to close its contacts Pa to complete an energizing circuit for stepping relay PC through contacts UXc, UXb, KUc and Pa. The operation of relay P also closes contacts Pb to complete a circuit to operate the first bridge step control relay CU1 and to operate normal bridge control relay CX. The operating circuit for the bridge stepping control relay CU1 extends through contacts UXc, Pb, Ca, Ba, Aa and UXd. The operating circuit for relay CX extends through contact UXc and Pb. Normal step relay CX operates to seal in through contacts CXb and UXc. Referring briefly to FIG. 2, it is to be noted that normally closed contacts CXa of normal stepping relay CX had already applied normal voltage to the null detector. As previously described, the normal voltage is initially established by the appropriate adjustment of potentiometer set PP1 while the bridge balancing resistor network BB is connected in the bridge through normally closed contacts CXa, that is, the voltage drop across the resistors BR5 through BR8 is connected in series with the voltage drop across the movable member and upper end of potentiometer P1 to establish the normal voltage of the unknown voltage V1. Accordingly, as relay CX operates to open contact CXa and as relay CU1 operates to close contact CU1a in the bridge balancing system BB, resistance BR3 is series added to the resistors BR4 through BR8, thus increasing the reference voltage about 12% of the previously established span voltage.

It is to be noted that the previously described operation of auxiliary unknown voltage relay UX to close contacts UXb and UXc in cooperation with contacts KUc effects operation of code start prevention relay X which operates at contacts Xa (FIG. 4) to open the energizing circuit for the coding relays C1 through C8 for the binary coder to prevent premature operation as will be hereinafter described in detail.

As stepping relay P operates, it closes contacts Pa to energize step relay PC, as previously described, which in turn operates at contacts PCa to open the energizing circuit for relay P. When relay P deenergizes, it opens the energizing circuit for relay PC which, when it releases, will again operate relay P. Thus, step relays P and PC continue to operate and release until released by the deenergizing of relay U as operated by the null detector amplifier. As relay P releases the first time, transfer relay A is energized through contacts UXd, CU1a, Bb and UXc. As relay P energizes the second time, relay CU2 is energized through contacts UXe, CU1b, Ac, Ba, Ca, Pb and UXc. When relay P releases the second time, relay B operates as its coil is energized through contacts CU2a, Cb and UXc. Contacts Bb open to release transfer relay A and counting relay CU1. Thus, the resistor BR3 is series added to resistors BR4 through BR8, thus increasing the bridge voltage another 12%. This process continues until the bridge voltage at least equals the unknown voltage V1 and the amplifier releases relay U. When relay U releases, relays P, PC and KU, are deenergized so that relays P and PC stop pulsing, and, after a short time delay, relay X will release to close contacts Xa to energize one of the code relays C1 through C8. Assuming that the bridge balances at position 3, the null amplifier will release relay U after relay CU3 operates and relay CU2 releases. Relay X will then energize code relay C3 through contact Xa and contact CU3a as relay X releases. Code relay C3 will cause the binary encoder to send out an appropriate binary code as will be hereinafter described in detail.

In order to prevent the bridge balancing system from hunting when the null point or bridge balancing point should occur at a voltage point greater than the voltage provided by one step of the bridge balancing system and less than the voltage provided by the next succeeding step of the bridge balancing system, an interlock system is provided in the bridge control relay system to prevent operation of the bridge balancing system in a direction opposite to that first taken by the system when moving from the normal position toward the bridge balancing position. Specifically, auxiliary indication relays UX and DX each have normally closed contacts UXh and DXa, respectively, for preventing a completion of the energization circuit of the other. Accordingly, the previously described operation of auxiliary indication relay UX in response to the operation of relay U opens the energizing circuit for auxiliary indicating relay DX at contacts UXh so that if relay D should thereafter operate, auxiliary relay DX is prevented from operation, which in turn prevents operation of the bridge control relays CD1–CD4.

In order to provide for effecting operation of the binary encoder to send a code corresponding to a zero reading in the event the unknown voltage should be normal, in which event no operation of the null detector amplifier or the bridge balancing mechanism will occur, there is provided a normal detecting relay TC (FIG. 3) which is normally energized and may be deenergized to operate a zero deviation code relay C0 (FIG. 4) only if the bridge is balanced when the connections are first made. Specifically, relay TC is normally energized through contacts T2c of timer relay T2, with the energization circuit of relay TC adapted to be shifted from control by contacts T2c to control by contacts T2d in cooperation with the contacts of either the normal balance relay CX or stepping switch control relay PP. Accordingly, when the timer T2 and relay PP operate to energize the stepping switch S1 as above described, contacts PPc close to complete a circuit through contacts T2d to energize relay TC. When relay PP is thereafter deenergized by operation of auxiliary step control relay PPX, as above described, contacts PPc open, and, if the bridge is unbalanced, normal balance relay CX is operated to close contacts CXc to complete a circuit through contacts T2a to maintain relay TC energized. However, if the bridge is balanced when relay PP releases, normal balance relay CX remains deenergized, thus releasing normal control relay TC which closes its contacts TCa in combination with contacts PPXd of auxiliary step control relay PPX to energize code relay C0 which operates the binary encoder as control relays C1–C8 operate the binary encoder as hereinafter described.

As will be hereinafter described in detail, the binary encoder operates at the end of each code transmission to effect operation of the normal reset relay NR to actuate the stepping switch S1 to the next function.

FIG. 2 discloses, in block form, two additional sets of ten potentiometer sets PS2 and PS3, each containing ten unknown voltages V1 through V10, six stepping levels SL1 through SL6, and ten potentiometer sets PP1 through PP10, identical to that comprising FIG. 1 of the drawing as designated PS1. The second set PS2 is operated by a second stepping relay S2, and the third set PS3 is operated by a third stepping switch S3. Operation of the stepping switches S1, S2, and S3, in sequence, effectively connects each of thirty unknown voltages and corresponding potentiometer set in a bridge circuit including the source S and the bridge balancing system BB, in the manner previously described.

In order to provide for sequentially operating the stepping switches S1, S2 and S3, there is provided a stepping switch control system comprising sequencing relays 1P, 2P and 3P (FIG. 3) successively operable in cooperation with transfer relays 1PX, 2PX and 3PX associated therewith, respectively, to transfer the stepping relay control relays PP and PPX from the control of one stepping relay to control the next stepping relay at the end of a ten point scanning operation of each stepping switch. When step control relay PP deenergizes to open contact PPb to deenergize step relay S1 to effect operation of the stepping switch movable member from the zero contact to the No. 1 contact on all stepping levels SL1 through SL6, an on normal contact S1b, which contact is closed only when stepping switch S1 is in the zero position, opens to deenergize normally energized sequence relay 1P which releases to close contacts 1Pa to set up a path through contact PPb for the energization of stepping switch S2 when contact relay PP next operates. At the same time, the operation of sequence relay 1P opens contact 1Pd and contact 1Pb to prevent premature operation of step relays S2 and S3, and closes contacts 1Pc to energize transfer relay 1PX. Relay 1PX closes its contact 1PXa to set up a circuit for energizing step relay S2. As the stepping relay S1 steps from the tenth point to the zero point at the end of a scanning operation, the on normal contact S1c recloses to energize sequence relay 1P which opens contact 1Pa to prevent energization of step relay S1 and which opens its contacts 1Pc to deenergize slow-to-release transfer relay 1PX, and closes contacts 1Pd to complete the previously set up energizing circuit for the stepping switch S2. In a similar manner, stepping relay S3 is connected, to be controlled by the control relays PP and PPX at the end of a stepping squence of relay S2.

In order to provide for stopping the step control relays PP and PPX at the end of a sequence of the last step relay S3 and for resetting the sealed-in timer relay T2, there is provided a last point reset relay LPR (FIG. 3) operable in response to the last point operation of stepping switch S3, as indicated by the joint operation of sequence relay 3P and transfer relay 3PX. Specifically, as the stepping switch S3 steps from the last point No. 10 to the zero point, thus effecting closing of the on normal contact S3c, a circuit is completed to operate sequence relay 3P which closes contacts 3Pd thus completing the energizing circuit for relay LPR contact NR1a, 3Pd and 3PXa. Relay LPR operates to lock in through contacts LPRb. The operation of last point reset relay LPR opens contacts LPRa to deenergize step control relays PP, PPX and timer relay T2. The apparatus is now ready for operation in response to the closing of clock timer contact CT.

The binary encoder-decoder in this application utilizes a five pulse code comprised of a different combination of long and short pulses for each digital value to be transmitted from the remote station to the master station. The binary system uses four pulses for information and one pulse for self-checking. The number of codes required for this application is ten, therefore a total of four pulses is required. The detection of single errors in a binary code requires one pulse in addition to the four information pulses used. Thus, this binary encoder will send out five pulses. Whether the check pulse is long or short depends upon whether the number of long pulses in the information code is even or odd. If the number of long pulses is even, the check pulse is short. Conversely, if the number of long pulses is odd, the check pulse is long.

Generally, a long pulse relay LP of the long time delay release type and a short pulse relay SP of the short time delay release type are each adapted when energized to open a normally energized line circuit extending from the remote station to the master station to thus provide long or short pulses, respectively. Selective operation of the pulse relays LP and SP to provide five consecutive pulses is controlled by pulse counting relays P1 through P5, and associated count transfer relays AS, BS and CS, and previously described coding relays C0 through C8. A start relay S, operated by the coding relays C0 through C8, initiates operation of the pulsing relays SP, LP and PX. An encoder reset relay NR1 operates at the end of a code transmission to initiate reset of the encoder system and to initiate the previously described stepping of the stepping switches S1, S2 or S3 in the analog-to-digital converter to the next function.

In describing the operation of the binary encoder, it will be assumed that coding relay C3 is operated by the analog-to-digital converter in the manner hereinbefore described in detail, thus indicating that the variable voltage V1 is three steps above normal predetermined voltage. The binary encoder operates automatically to send a code of pulses preassigned to the digit 3.

As relay C3 operates, contacts C3a close to complete an energizing circuit for start relay S (FIG. 4), which in turn closes its contact Sa to energize auxiliary pulsing relay PX (FIG. 5) through contact Sa, SPa, and LPa of long pulse relay LP. Auxiliary pulsing relay PX operates and energizes couting relay P1 through contact Sa of start relay S, contact PXa of auxiliary pulsing relay PX, and normally closed contacts ASa, BSa and CSa of count transfer relays AS, BS and CS, respectively. Counting relay P1 operates to energize long pulse relay LP through contacts PXa, C3b, P1a and ASb. The operation of long pulse relay LP opens contacts LPa to release auxiliary pulsing relay PX. As auxiliary relay PX releases, long pulse relay LP will be deenergized. Since long pulse relay LP is slow to release, a long pulse will be sent to the master station through the opening of contact LPb (FIG. 6). As relay PX releases, transfer relay AS operates through contact P1b, BSb and Sa. The release of long pulse relay LP closes contacts LPa and reenergizes auxiliary pulsing relay PX which operates to energize pulse count relay P2 through contacts P1c, ASc, PXb, Sa, BSa and CSa. The operation of pulse count relay P2 energizes short pulse relay SP through contacts PXa, C3c, P2a, BSb and Sa to effect the opening of contacts SPb (FIG. 6) to send out a short pulse over the line to the master station. When short pulse relay SP operates, auxiliary pulse relay PX is released through contact SPa. As auxiliary pulsing relay PX is released, transfer relay BS operates through contacts P2b, CSb and Sa. As transfer relay BS is energized, transfer relay AS and count relay P1 are released by the opening of contacts BSa. The release of auxiliary pulse relay PX opens contact PXa to release short pulse relay SP to terminate the short pulse sent to the master station.

Figure 5:
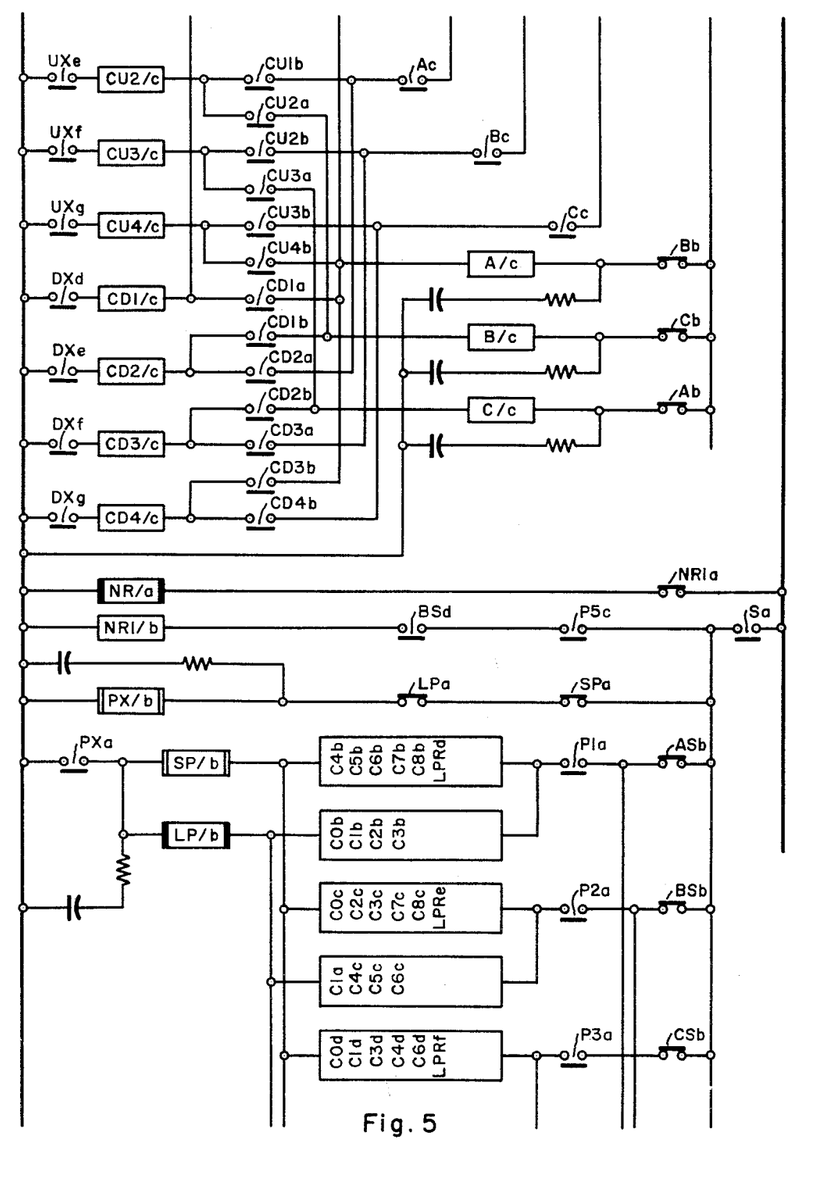
FIGS. 5 and 5A are a diagrammatic view of the bridge adjusting counting means for use with the converter of FIGS. 1 and 2, and the binary encoder transmitter system as controlled thereby.
Figure 5A:
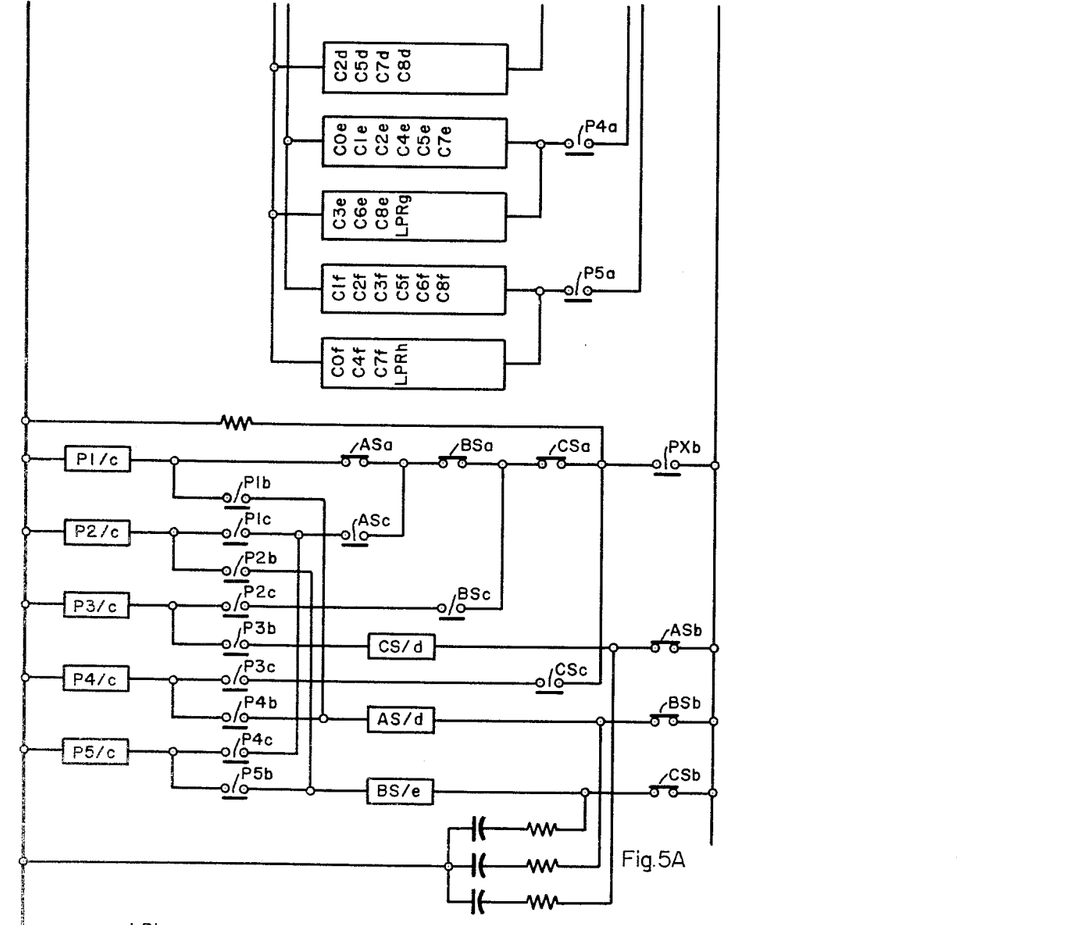
Figure 6:
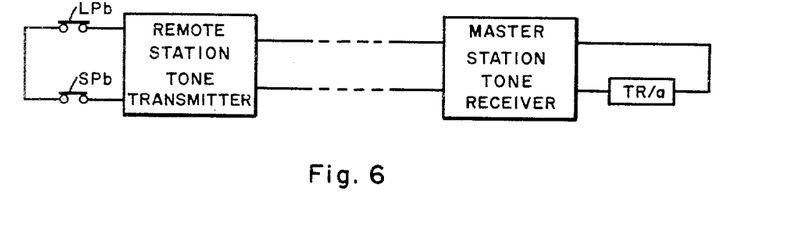
FIG. 6 is a diagrammatic view of the tone transmitter at the remote station and the associated tone receiver at the master station.

In like manner the third pulse, short, the fourth pulse, long, and the fifth pulse, short, are sent to the master station until pulse count relay P5 and transfer relay BS operate on the last pulse to close contacts P5c and BSd, respectively, in series with contacts Sa to energize reset relay NR1 (FIG. 5). Reset relay NR1 opens its contacts NR1a to effect deenergization of normal reset relay NR, which operates in a previously described manner to reset the analog-to-digital converter control system and to step the stepping switches S1, S2, or S3 to the next variable voltage and to the corresponding potentiometer equipment, and release control relays C0–C8. As control relay C3 releases, contact C3a opens to release start relay S, which in turn opens its contacts Sa to release reset relay NR1, counting relay P5 and transfer relay CS. The release of reset relay NR1 reenergizes normal reset relay NR to effect stepping of the prevailing stepping relay S1, S2 or S3.

Figure 7:
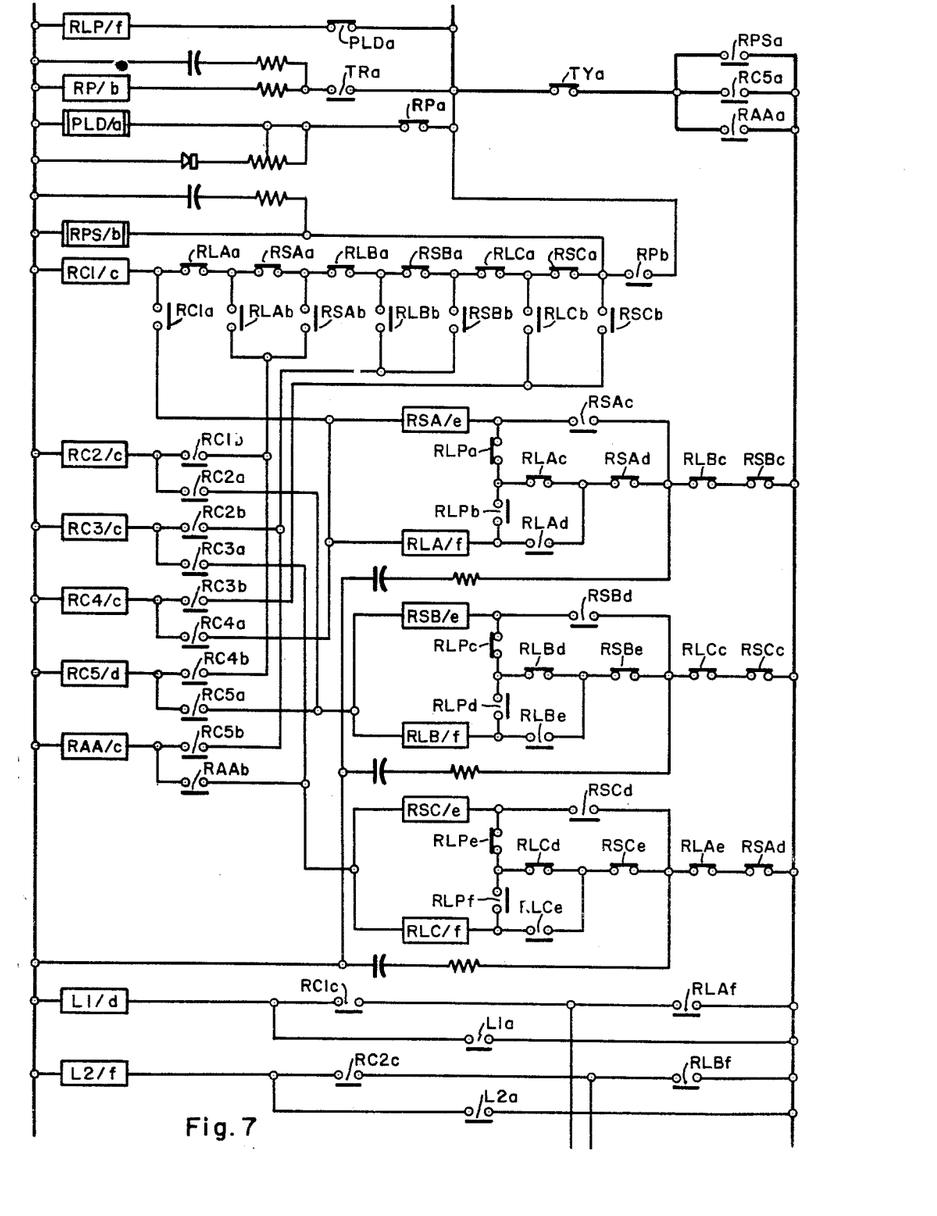
FIGS. 7 and 8A are a diagrammatic view of the binary receiver at the master station for use with the binary transmitter of FIGS. 5 and 6.
Figure 8A:
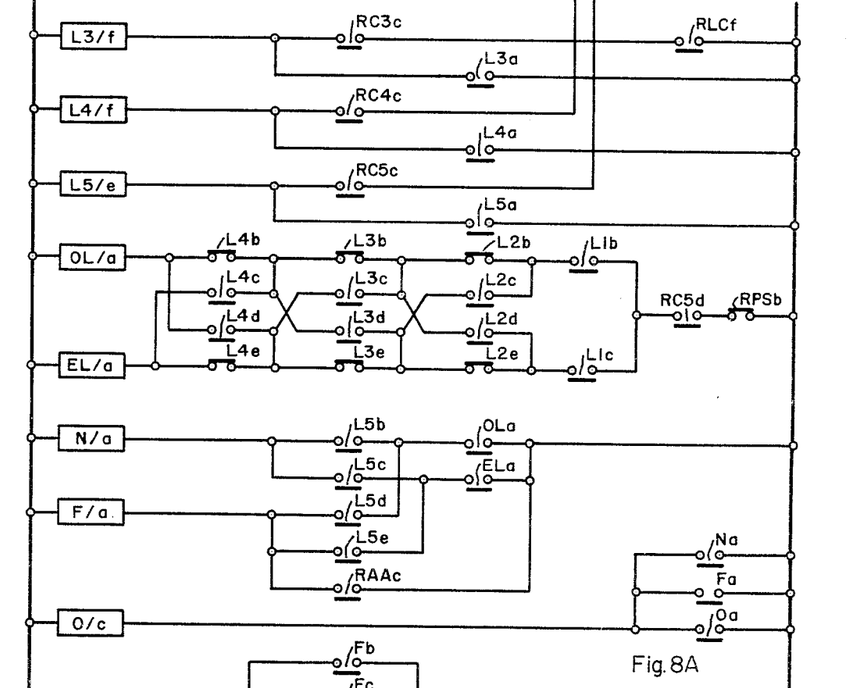
Figure 8B:
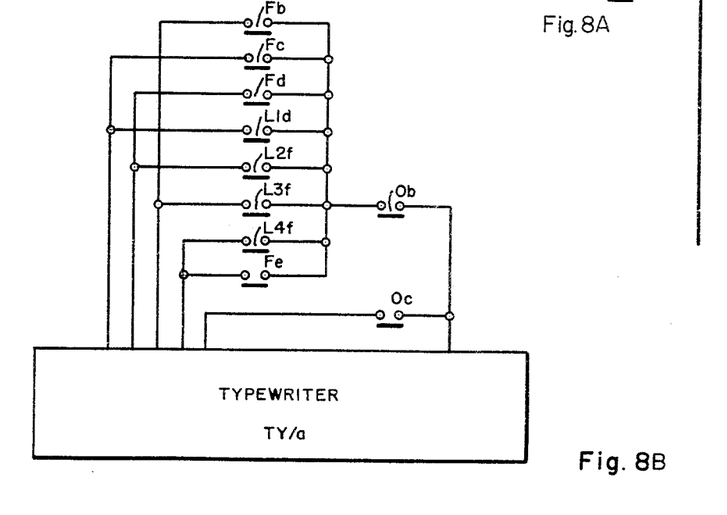
FIG. 8B is a diagrammatic view of the typewriter associated with the binary receiver at the master station.

At the master station as shown in FIGS. 7, 8A and 8B, a receiver pulse relay RP operates in response to each pulse received from the remote station to operate either a short pulse relay RPS or a long pulse relay RLP depending upon whether the incoming pulse is short or long, respectively. Pulse count relays RC1 through RC5 count each incoming pulse and cooperate with the short pulse relay RPS and the long pulse relay RLP to operate in sequence one or the other of either a short pulse indication relay or a long pulse indication relay in a different pair of pulse length indication relays RSA–SLA, RSB–RLB, and RSC–RLC. A plurality of long pulse register relays L1 through L5, each corresponding to one of the five signal intervals in the five digit code, are controlled by the pulse count relays RC1 through RC5 and the pulse length detecting relay pairs RSA–RLA, through RSC–RLC to operate only if a long pulse appears in the corresponding signal interval. A conventional single error detecting system controlled by the long pulse register relays L1 through L5 are provided to operate a check normal relay EL if no error is present in the received code, or, alternatively, to operate bad check relay OL if an error is detected. If the code as received is not faulty, normal relay N operates in cooperation with the operated long pulse register relays L1 to L4 to initiate operation of typewriter operate relay O, causing the typewriter to type the proper slug, which in the present exemplary operation is the plus three slug, and then tab the typewriter to the position of the second function. If the code is faulty, or if an extra pulse appears as indicated by extraneous pulse relay RAA, fault relay F is operated to cause the typewriter to tab to the next function without typing. A pulse stop reset relay RPS is provided to reset the entire decoder in the event a code is not completed.

The typewriter, shown in block form in FIG. 8B, may be basically of a commercially available type such as that marketed by Frieden Company of Rochester, New York under the trade name Flexiwriter, and includes a decoder system to perform its functions in accordance with the decoded information.

The basic typewriter is modified in accordance with this invention to provide for graphically illustrating the decoded information.

Figure 10:
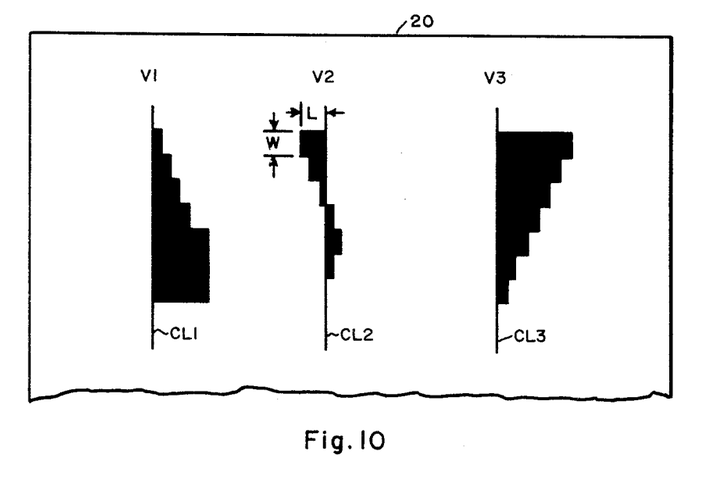
FIG. 10 is a chart showing graphical recordings of the deviation of each of a plurality of variables from its predetermined normal value.
Figure 11:
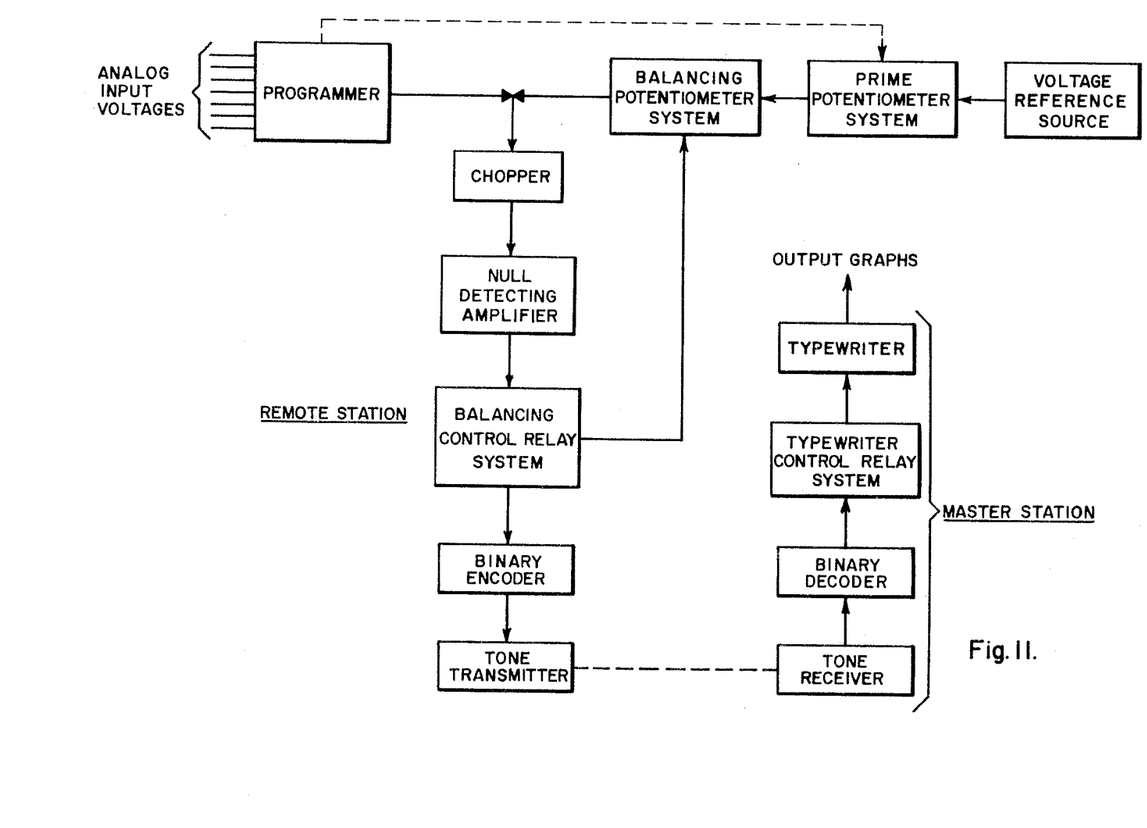
FIG. 11 is a block diagram showing the correlation between the principal elements of the invention.

The typewriter is modified to provide extra wide spacing between the teeth on the carriage rack gear so that each key stroke moves the carriage from one graph center line to the next as from center line CL1 to center line CL2 in FIG. 10. Also, the typewriter may be equipped with special slugs, wherein the printing portion of each slug is rectangular or bar-like in shape having the same width $w$ (FIG. 10) but having a different length $l$ representing one unit length, two unit length, and so forth, depending upon the magnitude of the decoded figure, and extending to the left or right side of a center line depending upon the direction of deviation from normal. Alternatively, slugs may be provided to print a dot a predetermined distance from a center line, the distance being governed by the magnitude of the deviation.

In describing a typical operation of the master station receiving equipment, it will be assumed that the code for the plus three indication is transmitted from the remote station in the manner previously indicated. This code, as described above, comprises five signals LSSLS, wherein each S represents a short signal and each L represents a long signal. As the tone receiver TR (FIG. 6) operates, its contacts TRa open to deenergize the normally energized receiver pulse relay RP (FIG. 7), which releases to pick up counting relay RC1 through contacts RLAa, RSAa, RLBa, RSBa, RLCa, RSCa and RPb, and, at the same time, pickup pulse stop reset relay RPS through the same contacts RPb. The long pulse detecting relay PLD, of the very slow release type, is deenergized by the opening of contacts RP and begins to time out. The release time of relay PLD is adjusted such that it will release on long pulses but not on short pulses. Inasmuch as the first pulse is long, the long pulse detecting relay PLD releases to close its contacts PLDa to energize long pulse relay RLP. The operation of long pulse relay RLP opens contacts RLPa and closes contacts RLPb to prepare long pulse indication relay RLA for operation. When the pulse ends, the tone receiver reenergizes to close contacts TRa, thus reenergizing receiver pulse relay RP. As pulse relay RP operates, long pulse indication relay RLa is energized through contacts RPSa, RSBa, RLBa, RSAb, RLAa, RLPb, RC1a and the coil of the first count relay RC1. As relay RLa operates, long pulse register relay L1 is energized through pulse length indication relay contacts RLAe and pulse count relay contacts RC1c and pulse stop reset contacts RPSa. Register relay L1 then seals in through its contacts L1a. As receiver pulse relay RP operates at the termination of the pulse, long pulse detector relay PLD is again operated through contacts RPa and releases long pulse relay RLP at contacts PLDa.

The second pulse operation is the same except that it is a short pulse, and therefore neither long pulse detector relay PLD nor long pulse relay RLP operates. Accordingly, in the next pair of pulse length indicator relays RSB–RLB, the short pulse indication relay RSB operates while long pulse indication relay RLB remains released, as the second counting relay RC2 operates. Therefore, long pulse register relay L2 remains deenergized.

In like manner, all five pulses are received, and since the code comprises signals LSSLS, register relays L1 and L4 are energized. At the end of the fifth pulse, normal relay EL is operated through contacts RC5d, L1b, L2b, L3b and L4c. Relay N is operated through contacts ELa and L5c. Relay N energizes the typewriter operate relay O at contacts Na. The combination of contacts L1d of register relay L1, L4f of register relay L4 and Ob and Oc of operate relay O, operate the typewriter which types slug 3 and tabs to the next function.

As the typewriter operates, its contacts TYa (FIG. 7) open to deenergize register relays L1 and L4, operate relay O, normal relay N, normal check relay EL, count relay C5 and indication relay RSB to thus reset the decoder. As the decoder resets, the typewriter is released and is ready to receive the indication relating to function 2.

If the received code is faulty, bad check relay OL will operate through the contacts of the wrongly positioned one of register relays L1–L5. The operation of bad check relay OL closes contacts OLa to energize fail relay F through contacts L5d of last register relay L5, whereupon contacts operate relay O is energized through contacts Fa. The combination of contacts Ob, Fc, Fd and Oc operate the typewriter to tab to the next function without typing.

In the event an additional pulse is received, additional count relay RAA (FIG. 7) is operated as an additional pulse count relay, through contacts RPb, RSCa, RLCa, either RSBb or RLBc and RC5b, and seals in at the end of the pulse through contacts RAAa, TYa, RSAb, RLAd, appropriate contacts of pulse length indication relays RSC or RLC, and contacts RAAb. The operation of the additional pulse relay RAA closes contacts RAAc to operate the code fail relay F which causes the typewriter to tab to the next position as previously described.

Since certain changes may be made in the above-described construction and different embodiments of the invention may be made without departing from the spirit and scope thereof, it is intended that all the matter contained in the above description and shown in the accompanying drawings should be considered as illustrative and not in a limiting sense.

We claim as our invention:

1. In apparatus for indicating the magnitude of deviation of an unknown variable quantity from a predetermined normal value of said variable quantity, means for providing a reference quantity equal to said predetermined normal value; means for comparing said unknown quantity to said reference quantity and including means for providing an output signal in accordance with the difference between the compared quantities; means responsive to said output signal for changing said reference quantity in digital steps to equal the value of the unknown quantity when said unknown quantity is not normal; means for indicating the magnitude of change in said reference quantity in digital steps to equal the value of the unknown quantity, relay means directly responsive to the indicating means for transmitting a binary code corresponding to the indication of the magnitude of the chage in said reference quantity, and receiving means at a remote station for decoding said code and indicating a value corresponding to the received code.

2. Telemetering apparatus, comprising: a plurality of resistor means each operable to be connected across a single regulated voltage source; each resistor means including tap means adjustable in digital steps to provide a voltage equal in value to a predetermined normal value of a different corresponding one of a plurality of different variable voltages; a difference indicating means; means for successively connecting the difference indicating means in circuit relation with each of said variable voltages and said resistor means to provide an indication of the difference in digital steps between each normal voltage and the corresponding variable voltage; relay means directly responsive to each indication of the difference indicating means to transmit a binary code corresponding to the magnitude of the difference; and receiving means at a remote station operable in response to each binary code to decode said binary code and provide a graphical indication corresponding to the received code.

3. In apparatus for measuring and indicating the difference between a reference voltage and a variable voltage which varies as a function of a quantity to be measured, potentiometer means connected across a regulated voltage source to provide a reference voltage equal to the predetermined normal value of the variable voltage; circuit means for connecting the variable voltage in series opposed relationship with said reference voltage; voltage difference detector means for indicating a balance between said reference voltage and said variable voltage and for providing a first output signal when the reference voltage is higher than the prevailing value of the variable voltage and for providing a second output signal when the reference voltage is lower than the variable voltage, chopper means connecting the circuit means to the voltage difference detector means, said potentiometer means comprising a plurality of series-connected resistance means having a plurality of junctions, means connecting one junction of said resistance means to said circuit means, balancing relay means operable to successively select a junction until a balance is achieved, control means responsive to said difference detector and operable to control said balancing relay means in response to said first output signal or said second output signal, respectively for indicating the magnitude of change in said reference quantity in digital steps to equal the value of the unknown quantity, relay means directly responsive to the indicating means for transmitting a binary code corresponding to the indication of the magnitude of the change in said reference quantity, and receiving means at a remote station for decoding said code and indicating a value corresponding to the received code.

4. In apparatus for indicating the magnitude of deviation of an unknown variable quantity from a predetermined normal value of said variable quantity, means for providing a reference quantity equal to said predetermined normal value; means for comparing said unknown quantity to said reference quantity and including means for providing an output signal in accordance with the difference between the compared quantities; means responsive to said output signal for changing said reference quantity in digital steps to equal the value of the unknown quantity when said unknown quantity is not normal; means for indicating the magnitude of change in said reference quantity in digital steps to equal the value of the unknown quantity, relay means directly responsive to the indicating means for transmitting a binary code corresponding to the indication of the magnitude of the change in said reference quantity, and receiving means at a remote station for decoding said code and indicating a value corresponding to the received code, said receiving means including recording means operable to record in graphical form the value corresponding to the received code.

5. Telemetering apparatus, comprising: a plurality of resistor means each operable to be connected across a single regulated voltage source; each resistor means including tap means adjustable in digital steps to provide a voltage equal in value to a predetermined normal value of a different corresponding one of a plurality of different variable voltages; a difference indicating means; means for successively connecting the difference indicating means in circuit relation with each of said variable voltages and said resistor means to provide an indication of the difference in digital steps between each normal voltage and the corresponding variable voltage; relay means directly responsive to each indication of the difference indicating means to transmit a binary code corresponding to the magnitude of the difference; and receiving means at a remote station operable in response to each binary code to decode said binary code and including recording means operable to provide a graphical indication corresponding to the received code.

6. In apparatus for measuring and indicating the difference between a reference voltage and a variable voltage which varies as a function of a quantity to be measured, potentiometer means connected across a regulated voltage source to provide a reference voltage equal to the predetermined normal value of the variable voltage; circuit means for connecting the variable voltage in series opposed relationship with said reference voltage; voltage difference detector means for indicating a balance between said reference voltage and said variable voltage and for providing a first output signal when the reference voltage is higher than the prevailing value of the variable voltage and for providing a second output signal when the reference voltage is lower than the variable voltage, chopper means connecting the circuit means to the voltage difference detector means, said potentiometer means comprising a plurality of series-connected resistance means having a plurality of junctions, means connecting one junction of said resistance means to said circuit means, balancing relay means operable to successively select a junction until a balance is achieved, control means responsive to said difference detector and operable to control said balancing relay means in response to said first output signal or said second output signal, respectively for indicating the magnitude of change in said reference quantity in digital steps to equal the value of the unknown quantity, relay means directly responsive to the indicating means for transmitting a binary code corresponding to the indication of the magnitude of the change in said reference quantity, and receiving means at a remote station for decoding said code and indicating a value corresponding to the received code, said receiving means including recording means operable to record in graphical form the value corresponding to the received code.

References Cited by the Examiner

UNITED STATES PATENTS

| 2,577,735 | 12/51 | Broomell | 340—187 |
| 2,689,950 | 9/54 | Bayliss | 340—183 |
| 2,755,020 | 7/56 | Belcher | 340—187 |
| 2,828,482 | 3/58 | Schumann | 340—187 |
| 2,896,198 | 7/59 | Bennett | 340—187 |
| 2,930,030 | 3/60 | Hirose | 340—187 |
| 2,981,107 | 4/61 | Anderson | 340—187 |
| 3,103,001 | 9/63 | Hage | 340—187 |

NEIL C. READ, *Primary Examiner.*

L. MILLER ANDRUS, THOMAS B. HABECKER,
*Examiners.*